(12) United States Patent
Kwatra et al.

(10) Patent No.: US 11,645,604 B2
(45) Date of Patent: May 9, 2023

(54) METHODS AND SYSTEMS FOR MANAGING CONCENTRATION IN WORK ENVIRONMENTS

(71) Applicant: INTERNATIONAL BUSINESS MACHINES CORPORATION, Armonk, NY (US)

(72) Inventors: Shikhar Kwatra, Durham, NC (US); Komminist Weldemariam, Ottawa (CA); Zachary A. Silverstein, Jacksonville, FL (US); Adam Lee Griffin, Dubuque, IA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 92 days.

(21) Appl. No.: 16/778,839

(22) Filed: Jan. 31, 2020

(65) Prior Publication Data

US 2021/0241203 A1    Aug. 5, 2021

(51) Int. Cl.
| | |
|---|---|
| *G06Q 10/0639* | (2023.01) |
| *G06Q 10/0635* | (2023.01) |
| *G06N 20/00* | (2019.01) |
| *G06F 21/12* | (2013.01) |
| *G06Q 10/1093* | (2023.01) |
| *G06V 40/16* | (2022.01) |

(52) U.S. Cl.
CPC ..... *G06Q 10/06398* (2013.01); *G06F 21/121* (2013.01); *G06N 20/00* (2019.01); *G06Q 10/0635* (2013.01); *G06Q 10/1097* (2013.01); *G06V 40/174* (2022.01)

(58) Field of Classification Search
CPC ......... G06Q 10/06398; G06Q 10/0635; G06Q 10/1097; G06F 21/121; G06N 20/00; G06V 40/174
USPC ................................................ 705/7.28, 7.42
See application file for complete search history.

(56) References Cited

U.S. PATENT DOCUMENTS

| | | | |
|---|---|---|---|
| 7,743,340 B2 | 6/2010 | Horvitz et al. | |
| 9,736,810 B1 | 8/2017 | Cudak et al. | |
| 2005/0055306 A1 | 3/2005 | Miller et al. | |
| 2012/0108997 A1* | 5/2012 | Guan | ..................... A61B 5/374 |
| | | | 600/545 |

(Continued)

FOREIGN PATENT DOCUMENTS

WO    2014084829 A1    6/2014

OTHER PUBLICATIONS

"System and Method of User Notification Management for Distraction Reduction" Authors et al.: Disclosed. IP.com Electronic Publication Date: Feb. 14, 2018 (3 Pages).

(Continued)

*Primary Examiner* — Charles Guiliano
(74) *Attorney, Agent, or Firm* — Griffiths & Seaton PLLC

(57) ABSTRACT

Embodiments for managing user concentration in a work environment are described. Information associated with a user is received. At least one characteristic of a task of the user is identified based on the information associated with the user. A concentration risk level associated with the user performing the task is determined based on the at least one characteristic of the task. A computing environment associated with the user performing the task is provided based on based on the concentration risk level.

18 Claims, 8 Drawing Sheets

(56) References Cited

U.S. PATENT DOCUMENTS

| | | | |
|---|---|---|---|
| 2013/0190903 A1 | 7/2013 | Balakrishnan et al. | |
| 2013/0238241 A1 | 9/2013 | Chelotti et al. | |
| 2013/0311925 A1* | 11/2013 | Denker | G06F 3/013 715/771 |
| 2018/0129994 A1 | 5/2018 | Fowler et al. | |
| 2018/0247241 A1* | 8/2018 | Avrahami | G06Q 10/06313 |
| 2019/0164103 A1 | 5/2019 | Ashraf et al. | |
| 2019/0205839 A1* | 7/2019 | Dotan-Cohen | G06Q 10/1093 |

OTHER PUBLICATIONS

"Opinion: Workplace technology is as addictive as a casino's slot machine—and makes us less productive" By Vivek Wadhwa Published: Jul. 30, 2018 at 8:48 a.m. ET (5 Pages).

"Take full control over your schedule with timeboxing" By Blaz Kos https://agileleanlife.com/timeboxing/ (7 Pages).

\* cited by examiner

METHODS AND SYSTEMS FOR MANAGING CONCENTRATION IN WORK ENVIRONMENTS

BACKGROUND OF THE INVENTION

Field of the Invention

The present invention relates in general to computing systems, and more particularly, to various embodiments for managing concentration in work environments.

Description of the Related Art

Users (e.g., employees) often have difficulty maintaining concentration when performing tasks. There is a tradeoff with users utilizing an increasing number of computing devices (e.g., mobile electronic devices, desktops, wearable devices, etc.) to become better connected. Specifically, although they may interact with more people and theoretically be more productive, the likelihood that they will lose concentration while performing a particular task increases.

For example, a recent study suggests that at least some workers check their email more than seventy times per day, which tends to increase worker frustration and stress, as interruptions may increase the total time necessary for completing a task. Further, it typically takes over twenty minutes to return to a task after an unrelated interruption, but many workers must switch their attention about every ten minutes and have difficulty remaining fully engaged.

While performance enhancing solutions, such as applications to block particular websites and "silent mode" on telephones, are available and sometimes used, these solutions generally require user planning and intervention. Additionally, even assuming such solutions are readily available, some users may have reservations about purposefully taking actions against themselves, even if it is in their best interest.

SUMMARY OF THE INVENTION

Various embodiments for managing user concentration in a work environment, by a processor, are provided. Information associated with a user is received. At least one characteristic of a task of the user is identified based on the information associated with the user. A concentration risk level associated with the user performing the task is determined based on the at least one characteristic of the task. A computing environment associated with the user performing the task is provided based on based on the concentration risk level.

In addition to the foregoing exemplary embodiment, various other system and computer program product embodiments are provided and supply related advantages. The foregoing Summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
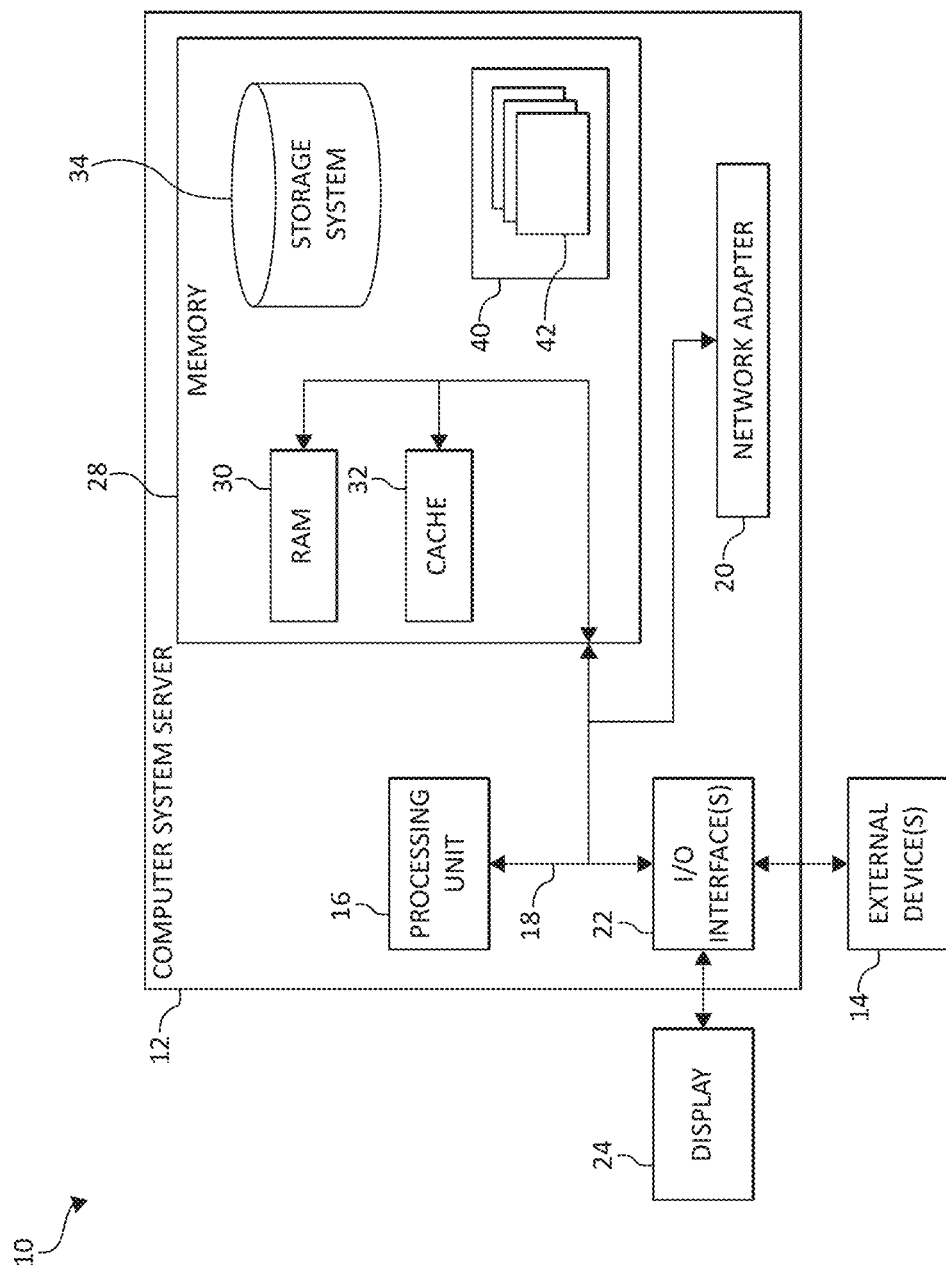
FIG. 1 is a block diagram depicting an exemplary computing node according to an embodiment of the present invention.

As discussed above, users (e.g., employees) often have difficulty maintaining concentration when performing tasks. There is a tradeoff with users utilizing an increasing number of computing devices (e.g., mobile electronic devices, desktops, wearable devices, etc.) to become better connected. Specifically, although they may interact with more people and theoretically be more productive, the likelihood that they will lose concentration while performing a particular task increases.

For example, a recent study suggests that at least some workers check their email more than seventy times per day, which tends to increase worker frustration and stress, as interruptions may increase the total time necessary for completing a task. Further, it typically takes over twenty minutes to return to a task after an unrelated interruption, but many workers must switch their attention about every ten minutes and have difficulty remaining fully engaged.

Some data suggests that the effects of such interruptions on workers' productivity, energy, and work satisfaction effectively cost an estimated $588 billion per year in the United States. Even users who may be able to not fall into time wasting habits may have their performance affected by interruptions. For example, one study suggests that after a 2.8 second interruption, at least some subjects (or users, individuals, etc.) doubled their error rates, and error rates tripled after a 4.5 second for some subjects. As such, the reduction of such errors in work and time wasted to due to peripheral and non-important notifications may have significant value.

While performance enhancing solutions, such as applications to block particular websites and "silent mode" on telephones, are available and sometimes used, these solutions generally require user planning and intervention. Additionally, even assuming such solutions are readily available, some users may have reservations about purposefully taking actions against themselves, even if it is in their best interest.

In view of the foregoing, a need exists for methods and systems that assist users in pursuing important or urgent activities by minimizing or preventing (potential) concentration reduction and/or interruptions caused by peripheral events, but still allowing critical notifications to be received.

To address these needs, embodiments described herein provide methods and systems that, for example, generate resources and content (and/or provide or alter a computing environment) to provide a high concentration (or "concentration-conducive") and/or interruption-free (or at least a relatively low interruption) work environment to a user (e.g., an individual, employee, etc.).

In some embodiments, user input data (e.g., information associated with the user and/or information from various sources associated with the user) is received. Characteristics (or at least one characteristic) of a task or job of the user (e.g., writing a patent application, writing software code, preparing a proposal or presentation, reading material, etc.) are identified based on the information associated with the user. A concentration risk level (or score or grade) is determined or calculated for the task (e.g., it is determined whether or not the task should be performed in a relatively low disruption/interruption and/or high concentration environment) based on the task characteristic(s) and/or the information associated with the user (e.g., the type of task, the importance of the task for the user, timelines/deadlines/schedules for completing the task, etc.).

In some embodiments, depending on the determined concentration risk level (and/or user information and/or task characteristic(s)), one or more ameliorative action is taken to manage (or reduce, limit, etc.) concentration reducing events (e.g., events that may at least potentially interrupt the user's productivity) while the user is performing the task. For example, a computing environment associated with the task may be provided or changed in such a way to reduce potentially disruptive events to the user while they are performing the task (e.g., via disabling notifications from at least some applications and/or limiting the functionality of some applications), provide content and/or resources required to perform the task, and/or a recommendation may be generated (and provided via a notification) with respect to the user's schedule (e.g., when the task should be performed, reschedule the task, etc.) and/or location (e.g., where the task should be performed).

Whether or not particular tasks should be performed in a high concentration (and/or at least relatively low interruption) contexts (or environments) may be estimated (or determined, ascertained, etc.) from various information sources associated with the user, such as "to-do" lists (e.g., entries in a "notes" application), electronic calendar/schedule entries, various types of communications (e.g., emails, text messages, phone calls, in-person conversations, etc.), along with any other information or information sources described herein, including the user's previous activities (e.g., performing similar tasks). The process of content caching (and offline content management) may be trigged based on the estimated intent to work in high concentration settings.

The methods and/or systems described herein may run, for example, in the background of various computing systems and/or applications, such as electronic calendar systems, project management tools, etc., or as independent applications on user devices (e.g., mobile phones, desktop PCs, etc.). The system may also identify work items (or tasks) that need (or are ideally performed in) interruption-free environments and determine factors that are used to prepare resources and content for a user to accomplish the identified tasks. In some embodiments, the user may manually select or specify appropriate concentration and/or disruption levels and/or environment types for specific tasks (e.g., via a scheduler, calendar, etc.).

In some embodiments, the system may collect multiple data points, such as type of work and/or work items, profiles, personal preferences, concentration and/or interruption factors (e.g., frequent application notifications, such as from emails, social media posts, conference calls, etc., other individuals in the vicinity), historical resources, and content/resources used, calendar, location, user's cognitive state (e.g., mood), and affective signals (e.g., using various sensors). The system may also infer or model the user state (e.g., cognitive state) from multiple heterogeneous inputs on a computing device (e.g., tablet or mobile phone) and generate optimal resource and content for the user needed for an interruption-free work environment in association with the work item by employing heuristics and machine learning algorithms.

The system may identify characteristics of the task (e.g., patent writing, code writing, proposal preparation, reading a proposal, etc.) and determine whether or not task should be performed in a relatively high concentration environment (and/or determine a concentration risk level for the task). For example, the characteristic(s) of the task may include the type of task, the importance of the task for the user, timelines/deadlines/schedules for completing the task, etc. If appropriate, the system may prepare or change the relevant computing environment by, for example, disabling notifications from particular sources, such as email, social media platforms, phones, etc., and/or providing content and/or resources needed to perform the task (e.g., opening particular applications and/or files). The system may (also) provide various types of recommendations via notifications (e.g., electronic communications, pop-up windows/messages), such as recommended schedule changes (e.g., performing the particular task at a later/different time) and locations (e.g., recommending a particular location to perform the task). Concentration reducing events maybe related to and/or caused by computing systems, humans, animals, etc.

As mentioned above, the system may determine a concern or risk level (or a concentration risk level or estimated interruption level) associated with a user task or part of a task. The risk level may be based on information associated with the task (e.g., the importance of the task to the user) and/or information associated with the environment of the user (e.g., the environment in which the user is going to perform or is performing the task). In some embodiments, if the risk level exceeds a predetermined threshold, the system may perform one of the ameliorative actions described above, such as disabling notifications and/or providing recommendations with respect to time and/or place to perform the task (e.g., provide a notification that recommends the task be performed at a particular time in a particular location), which may be based on, for example, the user's schedule, to-do items, social media activity, and/or previous geo-spatial or spatiotemporal activity (or movements). In some embodiments, the system may create an offline calendar entry on the user's electronic calendar. The system may also trigger and utilize an offline resource pooling and catching module.

The determining of the concentration risk level for tasks may be based on monitoring of the user's interaction with emails, notifications, messages, meetings, conference calls, etc. In some embodiments, the system may determine a concentration and/or interruption level associated with particular locations (e.g., based on the number of people in the vicinity, activities of the people, etc.). Such may also be utilized to determine whether or not any ameliorative actions should be taken (and/or the concentration risk level).

In some embodiments, the ameliorative action(s) may include disabling other computing environment functionality, such as applications or particular features of applications, for a certain period of time and/or removing graphical user interface (GUI) icons normally used to open applications and/or files from the computing environment (i.e., such that they are not visible/accessible on the "desktop"). The reactivation of such features may be based on providing the user with queries (e.g., "May I resume normal operation now?" or "Would you like to re-enable notifications and full system functionality?"). Completely Automated Public Turing test to tell Computers and Humans Apart (CAPTCHA)-type challenges may also be utilized. The challenge generation may be based on, for example, learning the progression on the work item (or task, project, etc.), the user's cognitive state or behavior (e.g., bored, stressed, etc.), actions performed, history of interactions with one or more devices, and current user context.

In some embodiments, the user may manually tag or label particular tasks as those that should be done in low interruption environments. The system may utilize such as input for assessing concentration risk levels of future tasks. Also, in some embodiments, the system may analyze tasks or work items introduced to the system and recommend that at least some of them be performed in relatively low interruption environments (e.g., based on similarities to other tasks/work items performed in low interruption environments).

In some embodiments, the cognitive state of the user may be estimated or determined and utilized in concentration (and/or interruption) analysis. Such may be performed utilizing, for example, facial expression analysis (e.g., via a camera), biometric information (e.g., breathing patterns, heart rate, etc. via biometric sensors), and any other information/input which may aid in concentration analysis. For example, the user's utilization of their computing environment may be taken into consideration (e.g., the user has nine windows open on their desktop PC while talking on the phone). In some embodiments, the user's cognitive state may be learned and/or estimated from various user activities, based on analysis of messages/notifications/emails received, joint analysis of phone calls received, etc.

As one example of functionality of the methods and systems described herein, consider a scenario in which a user is working on an engineering project or invention at their home while their spouse is at work and their child is at school. When the child gets home from school (e.g., as determined based on contextually learning the family members' schedules and/or recognizing the child entering the home via a security camera or other sensor feeds), the system immediately takes an action to reduce the (at least potential) concentration reducing and/or interruptive effect(s) caused by the child being at home. As one example, the system may generate a notification of a recommendation to switch to another task that does not require such a high level of concentration, such as doing chores or a less important work-related activity. Also, in some embodiments, the system may disable some functionality of the computing environment (e.g., with the user's advanced permission). For example, if the user is utilizing a particular application to work on the engineering project, when the child arrives home, the system may automatically save the user's progress and prevent the user from doing any more work or "lock" the user out (e.g., for a particular period of time, until the child is determined to have left the home again, until the user moves to a different location, etc.).

Additionally, other types of data may be utilized to determine the reactions of the users, including data collected or detected by sensors, such as cameras (e.g., for facial/mood recognition), microphones (e.g., for detecting spoken content), and biometric sensors (e.g., heart rate and/or blood pressure monitors), such as those on wearable technology devices (e.g., smart watches).

The system may utilize various types of parameters to determine whether or not any ameliorative action is to be taken and/or select the particular ameliorative action(s) taken. For example, region-based convolutional neural network (R-CNN) pixel mapping may be utilized to detect activity via sensor (e.g., camera) feeds, select/recommend a work environment/location, and suggest a particular task to be performed. A daily schedule (e.g., determined via a calendar/schedule and/or learned utilizing various devices, sensors, etc.) may be monitored to check activities in conjunction with geo-spatial and temporal metrics. Tasks may be categorized and/or prioritized using clustering methods (e.g., k-means clustering) with different risk thresholds. Previous pattern analysis and/or success rates based on probabilistic computation may also be utilized. The cognitive state of the user while executing certain tasks (e.g., utilizing Principal Component Analysis (PCA) for dimensionality reduction and understanding user's emotional state) may be used to determine the user's concentration level. Conversation (e.g., telephonic, email, text messages, in-person, etc.) monitoring may also be utilized (e.g., via Mel-frequency cepstral coefficients (MFCCs) for audio content and natural language processing (NLP) and/or natural language understanding (NLU) for text-based content).

Also, in some embodiments, enterprise learning may be utilized, which deals with the learning of users' job roles within an organization, thereby permitting additional context into specific work items/tasks for users in the work environment. For example, if the user is a software programmer, one of their primary and most important tasks may be writing code. As such, in some embodiments, weighting schemes may be applied to tasks so that users' relatively important tasks are given priority to be performed in relatively high concentration (and/or low interruptive/disruption) environments.

As described above, the system may utilize or perform various ameliorative actions (i.e., to manage and/or reduce interruptions to and/or manage/enhance the concentration of the user while performing a particular task) based on, for example, the level of concentration needed for particular tasks, the importance of particular tasks for users, etc. For example, the system may disable (or enable) and/or prioritize particular notifications depending on the concentration required and/or importance of the task being performed. The system may also provide recommendations, such as suggesting that the user performs an alternative task at a particular location, suggest that a particular task be performed at a different location, and/or rearrange the user's schedule and/or work items. The system may (also) provide computing environment content and/or resources related to a particular task (e.g., automatically open applications, files, etc. that are associated with particular tasks) and/or map project activities/work items for an organization or individual user to maximize the efficiency of a project's use of available resources. Additionally, GUI mapping may be performed with respect to learning the user's activity or tasks performed in conjunction with particular environments for performing the tasks.

At least some of the aspects of functionality described herein may be performed utilizing a cognitive analysis (or machine learning technique). The cognitive analysis may include NLP and/or NLU processes, such classifying natural language, analyzing tone, and analyzing sentiment (e.g., scanning for keywords, key phrases, etc.) with respect to, for example, content (or data), communications sent to and/or received by users, and/or other available data sources. In some embodiments, MFCCs (e.g., for audio content detected by a microphone) and/or R-CNN pixel mapping (e.g., for object detection/classification in images/videos), as are commonly understood, may (also) be used.

In some embodiments, a cognitive analysis may be used to generate profiles for users, determine the importance of particular tasks to users, determine the level of concentration needed to perform particular tasks, and/or determine the concentration reducing effects of certain events (e.g., notifications, other individuals in the environment, etc.). Such may be performed utilized various data (or information) sources associated with the users and/or the tasks. The data sources may include any appropriate data sources associated with the user(s) that are accessible by the system (perhaps with the permission or authorization of the user). Examples of such data sources include, but are not limited to, a profile of (or basic information about) the user (e.g., job title, place of work, length of time at current position, family role, etc.), a schedule or calendar (i.e., the items listed thereon, time frames, etc.), projects (e.g., past, current, or future work-related projects), electronic communications (e.g., email, text messages, etc.), social media activity (e.g., posts, reactions, comments, groups, etc.), browsing history (e.g., web pages visited), and online purchases. Additionally, data may be collected from various types of sensors, such as cameras, microphones, and biometric sensors.

As such, in some embodiments, the methods and/or systems described herein may utilize a "cognitive analysis," "cognitive system," "machine learning," "cognitive modeling," "predictive analytics," and/or "data analytics," as is commonly understood by one skilled in the art. Generally, these processes may include, for example, receiving and/or retrieving multiple sets of inputs, and the associated outputs, of one or more systems and processing the data (e.g., using a computing system and/or processor) to generate or extract models, rules, etc. that correspond to, govern, and/or estimate the operation of the system(s), or with respect to the embodiments described herein, the management of (user) concentration in work environments. Utilizing the models, the performance (or operation) of the system (e.g., utilizing/based on new inputs) may be predicted and/or the performance of the system may be optimized by investigating how changes in the input(s) effect the output(s).

It should be understood that as used herein, the term "computing node" (or simply "node") may refer to a computing device and/or an application. In other words, as used herein, examples of computing nodes include, for example, computing devices such as mobile phones, tablet devices, desktop computers, or other devices, such as appliances (IoT appliances) that are owned and/or otherwise associated with individuals (or users), and/or various applications that are utilized by the individuals on such computing devices.

In particular, in some embodiments, a method for managing user concentration in a work environment, by a processor, is provided. Information associated with a user is received. At least one characteristic of a task of the user is identified based on the information associated with the user. A concentration risk level associated with the user performing the task is determined based on the at least one characteristic of the task. A computing environment associated with the user performing the task is provided based on based on the concentration risk level.

The providing of the computing environment associated with the user performing the task may include at least one disabling notifications associated with at least one application within the computing environment and limiting functionality of at least one application within the computing environment. The providing of the computing environment associated with the user performing the task may include generating a recommendation associated with at least one of a schedule of the user and a location for performing the task and generating a notification indicative of the generated recommendation.

The information associated with the user may include at least one of a profile of the user, a schedule of the user, electronic communications of the user, and social media activity of the user. At least some of the information associated with the user may be detected utilizing a sensor. The senor may include at least one of a camera, a microphone, and a biometric sensor.

The at least on characteristic of the task may include at least one of a task type associated with the task and a software application associated with the task. At least one of the identifying of the at least one characteristic of a task of the user and the determining of the concentration risk level associated with the user performing the task (and/or any other functionality described herein) may be performed utilizing a cognitive analysis.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 (and/or one or more processors described herein) is capable of implementing and/or performing (or causing or enabling) any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in, for example, personal computer systems, mobile electronic devices (e.g., mobile phones, personal data assistants (PDAs), laptop devices, etc.), network PCs, and servers. For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
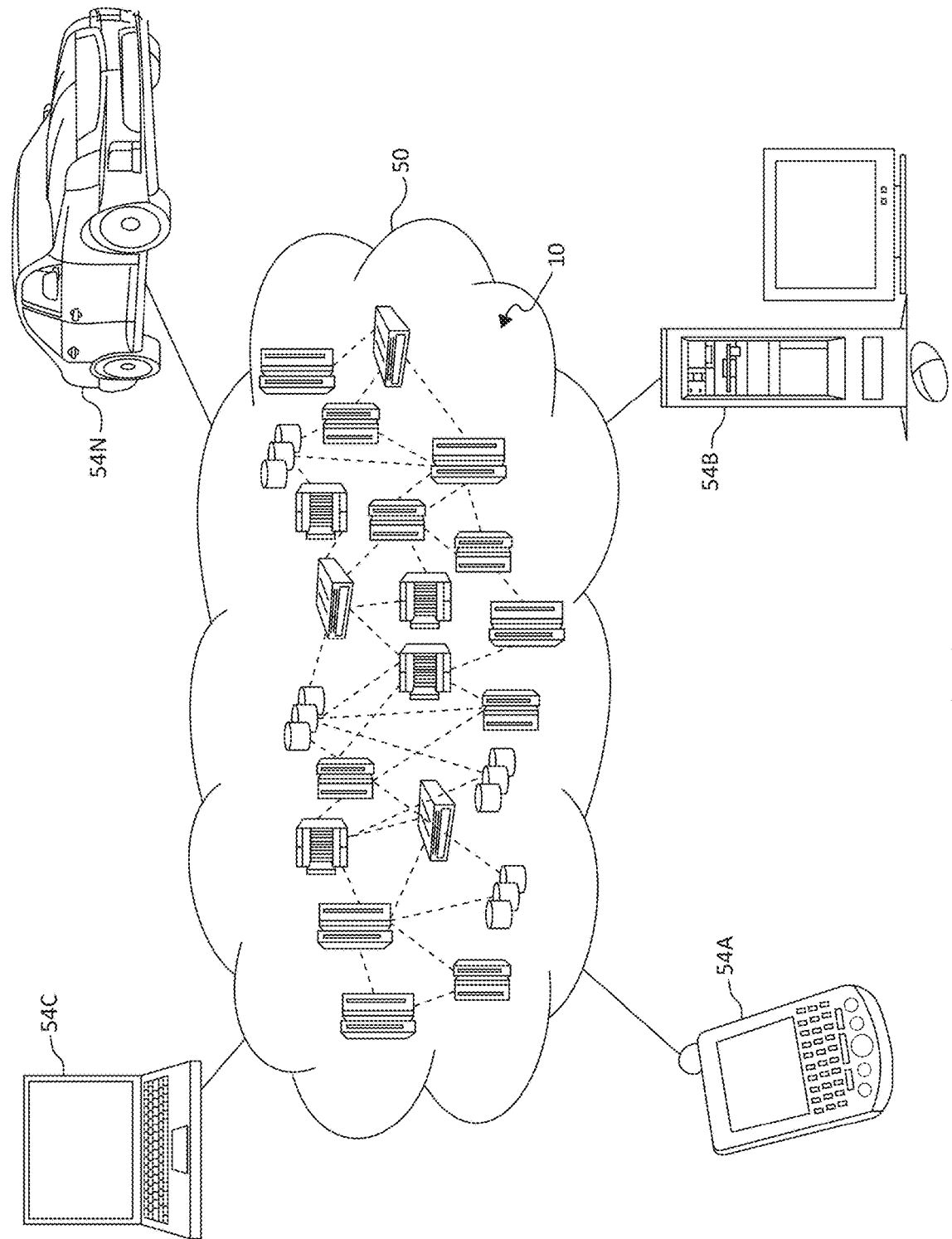
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, PDA or cellular telephone 54A, desktop computer 54B, laptop computer 54C, and/or automobile computer system 54N may communicate.

Still referring to FIG. 2, nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
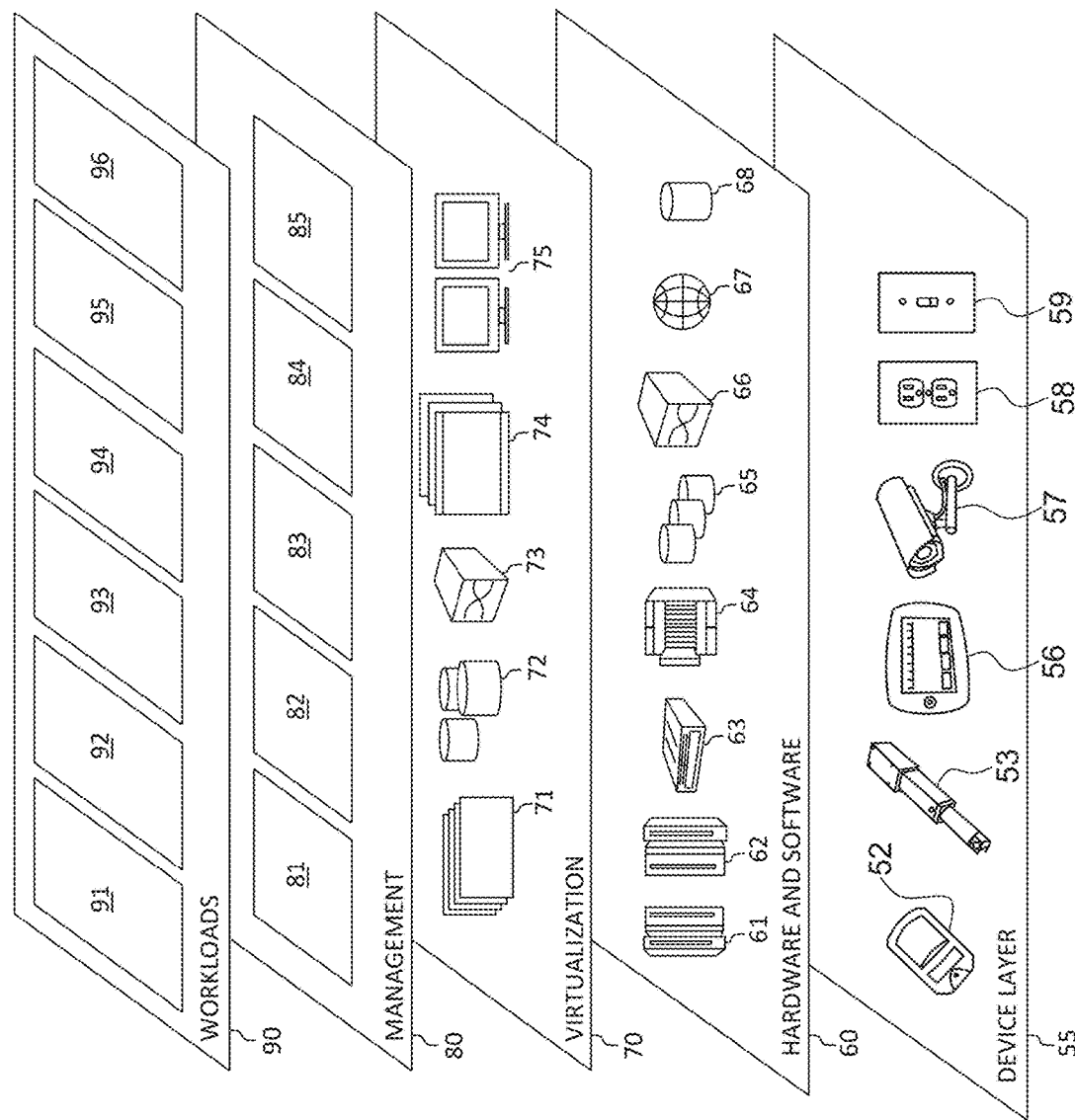
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to, various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for managing concentration in work environments as described herein. One of ordinary skill in the art will appreciate that the workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, the methods and systems of the illustrated embodiments provide novel approaches for managing concentration in work environments. In some embodiments, user input data (e.g., information associated with the user and/or information from various sources associated with the user) is received. Characteristics (or at least one characteristic) of a task or job of the user (e.g., writing a patent application, writing software code, preparing a proposal or presentation, reading material, etc.) are identified based on the information associated with the user. A concentration risk level (or score or grade) is determined or calculated for the task (i.e., it is determined whether or not the task should be performed in a relatively low interruption/high concentration environment) based on the task characteristic(s) and/or the information associated with the user (e.g., the type of task, the importance of the task for the user, timelines/deadlines/schedules for completing the task, events/productivity when performing previous tasks while particular events occurred, etc.). Depending on the determined concentration risk level (and/or user information and/or task characteristic(s)), one or more ameliorative action may be taken to manage (or reduce, limit, etc.) concentration reducing events while the user is performing the task.

Figure 4:
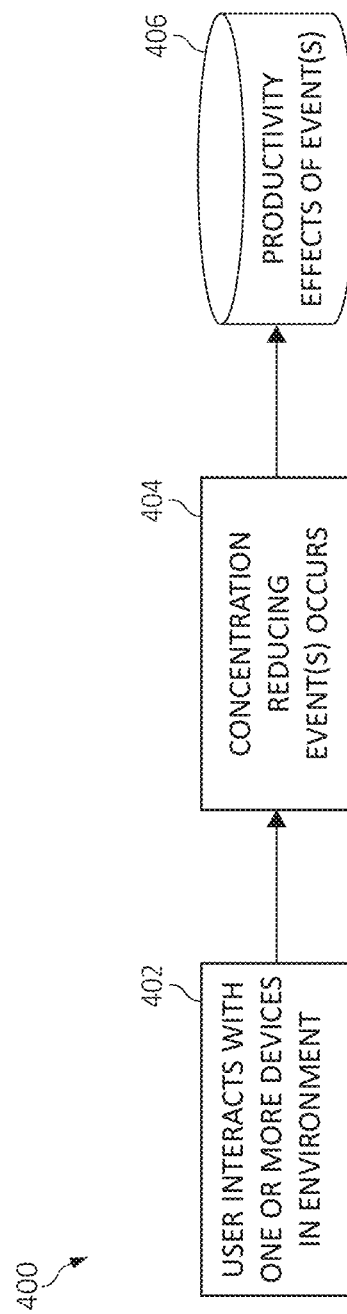
FIG. 4 is a flowchart diagram of a method for training a system according to an embodiment of the present invention.

FIG. 4 illustrates a method (and/or system) 400 according to some aspects of functionality described herein. More particularly, the method 400 may include a learning and/or training phase of embodiments described herein. At block 402, a user interacts with one or more devices (e.g., computing devices) within an environment (e.g., a computing environment). In particular, the user's interaction with the device(s) may include the user performing a task (or multiple tasks), such as related to their workplace (e.g., preparing a presentation, writing code, etc.) or any other type of task (e.g., shopping, reviewing a child's homework, etc.), even tasks which are not directly performed utilizing computing devices (e.g., household chores, exercising, etc.).

At block 404, one or more concentration reducing event occurs (e.g., within the environment in such a way that the user's concentration on the task may be affected). The concentration reducing event(s) may include any type of event described herein, such as receiving (e.g., via a computing device) a notification from an email application or social media platform, one or more other individuals performing an action (e.g., as detected via IoT devices), or any other suitable event. When such an event occurs, the system may track and/or monitor the user's activity to determine the extent to which the user is interrupted by the event(s) (e.g., by monitoring the user's progress on the task, tracking whether or not the user responds to notifications, etc.). At block 406, the effects of the event(s) with respect to the user's productivity are stored (e.g., on a database, on the "cloud," etc.). Over time, the system may develop an understanding how likely the user's concentration and/or productivity is affected by particular events, which may then be utilized as described below.

Figure 5:
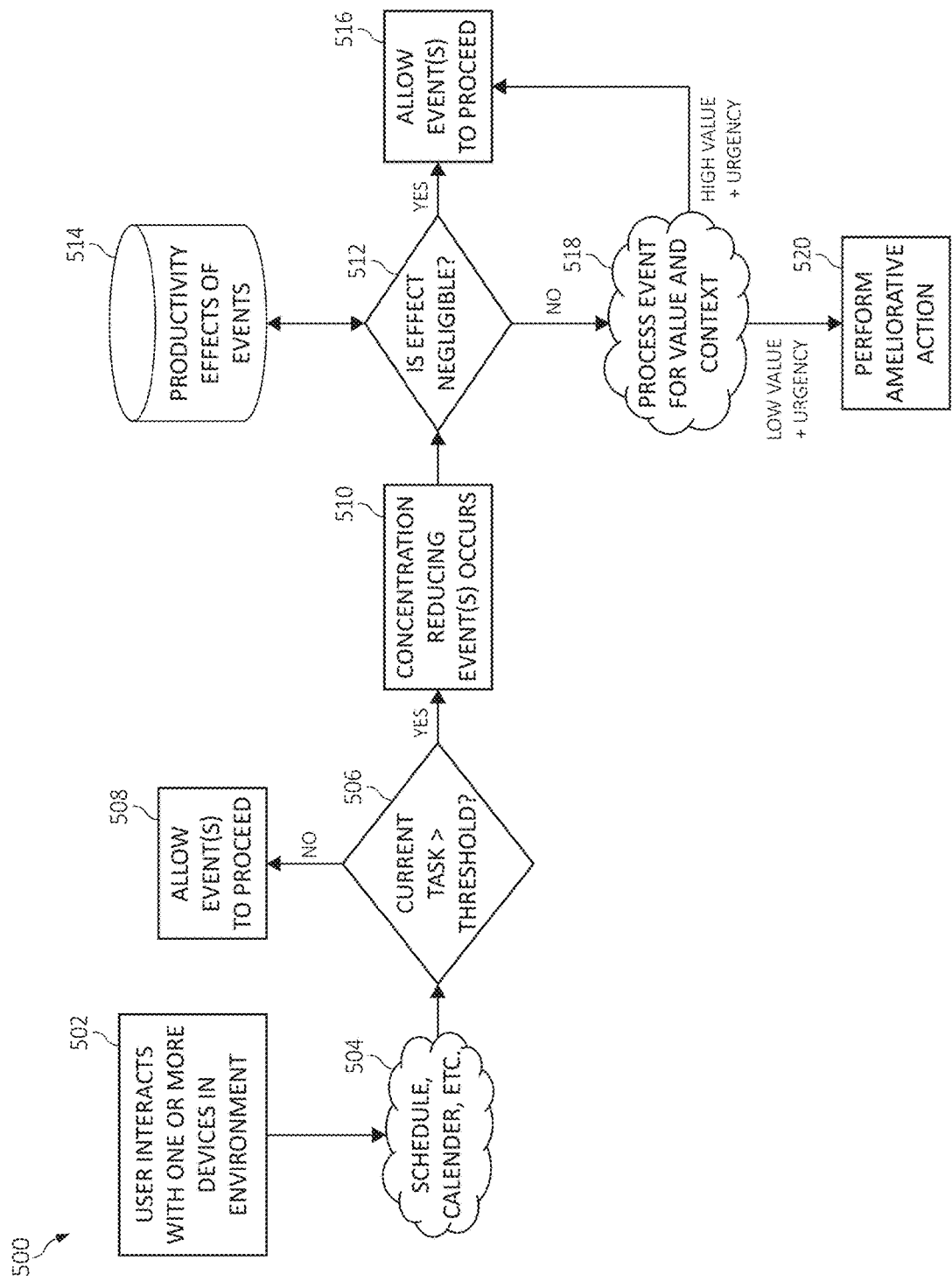
FIG. 5 is a flowchart diagram of a method for managing concentration in work environments according to an embodiment of the present invention.

FIG. 5 illustrates a method (and/or system) 500 for managing (or enhancing, improving, maintaining, etc.) concentration (e.g., in a work environment) according to some embodiments described herein. At block 502, a user interacts with one or more devices (e.g., computing devices) within an environment (e.g., a computing environment). At block 504, the system utilizes received (or available) information associated with the user to determine the current task being performed by the user and/or any tasks which are to be initiated in the (near) future. Additionally, the system may determine the relative importance of any such tasks for the user, as described above.

Utilizing such, at block 506, the system determines whether or not the importance of the particular task (e.g., a task already being performed by the user) and/or a concentration risk level of the particular task exceeds a predetermined threshold. This process may include calculating an importance score (e.g., a numerical score) or grade (e.g., "high," "low," etc.) (and/or concentration risk level) for the task (and/or each task identified in the user's information). This process may be performed utilizing a cognitive analysis, as described above. If the task does not exceed the threshold, at block 508, any concentration reducing events that occur and/or are detected while the user is performing the task are allowed to proceed (i.e., no ameliorative actions are taken), regardless of the potential impact to the user's concentration, productivity, etc.

If the task does exceed the threshold, the method 500 proceeds as follows. At block 510, one or more concentration reducing event occurs (and/or is detected). At block 512, it is determined whether or not the effect(s) of the event(s) is negligible (and/or the severity of the effect(s) is determined). To determine such, the system may search a database 514 on which the effect(s) on the user's productivity caused by previous events is stored (e.g., as generated during the training phase described above and/or collected via "crowdsourcing"). This process may be performed utilizing a cognitive analysis and include calculating a score or grade associated with the effect(s) of the event. If the effect is negligible (or below a predetermined threshold), at block 516, the event is allowed to proceed (i.e., no ameliorative actions are taken).

If the effect of the concentration reducing event(s) is not negligible, at block 518, the event is analyzed or processed to determine its value (or importance), context, etc. In other words, the system may analyze all available information related to the event (e.g., a notification), the task, and/or the user to determine how valuable and/or urgent the notification is to the user while the user is performing the current task. Again, such a process may be performed utilizing a cognitive analysis and include calculating a score or grade associated with the value and/or urgency of the event. If the event is determined to have high value and/or urgency (e.g., an urgent email from a manager), at block 516, the event is allowed to proceed (i.e., no ameliorative actions are taken).

If the concentration reducing event is determined to have low value and/or urgency (e.g., a relatively unimportant email from a manager), at block 520, one or more ameliorative actions are performed, such as those described herein (e.g., disabling notifications, limiting application functionality, providing recommendations, etc.).

Figure 6:
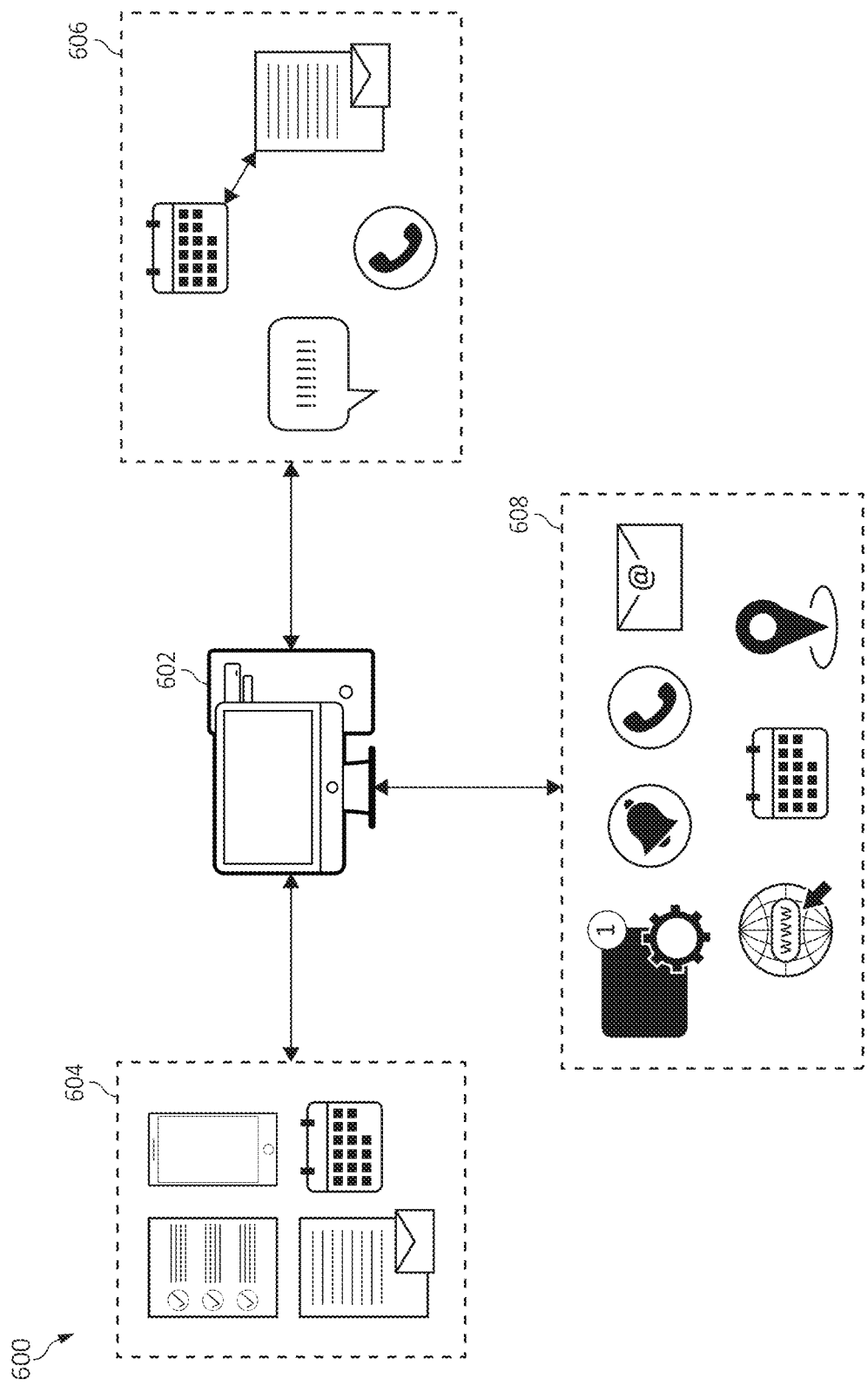
FIG. 6 is a block diagram of a system for managing concentration in work environments according to an embodiment of the present invention.

FIG. 6 illustrates a system 600 for managing concentration in work environments according to some embodiments described herein. In the exemplary system shown, a central computing device 602 (e.g., one or more of the computing devices/system described above) utilizes (and/or includes) a task/activity urgency and value assignor system 604, an event urgency detection system 606, and an ameliorative action system 608 (e.g., each of which may be implemented locally and/or remotely on any suitable computing systems).

The task/activity urgency and value assignor system 604 may utilize various data sources, applications, resources, etc., such as project management tooling, work organization applications, NLP processed communications, and calendars/schedules, to, for example, identify users' tasks, work items, activities, etc. and assign a urgency and/or value to each. Such may be utilized to perform the management of concentration in work environments, as described above.

The event urgency detection system 606 may utilize various data sources, applications, resources, etc., such as any detected events, results of NLP processes performed on various types of communications (e.g., emails, text messages, etc.), profile information of contacts (e.g., roles), and event association (e.g., associating a scheduled event to a received email based on keywords, etc.), to, for example, determine the urgency and/or value of concentration reducing events to users, as described above.

The ameliorative action system 608 may utilize and/or control any suitable computing environment functionality to perform one or more of the ameliorative actions described herein. Examples include, but are not limited to, disabling notifications, disabling alarms, disabling (phone) calls, hiding (or blocking) emails, texts, etc., blocking websites, changing schedules, and suggesting alternative locations.

Figure 7:
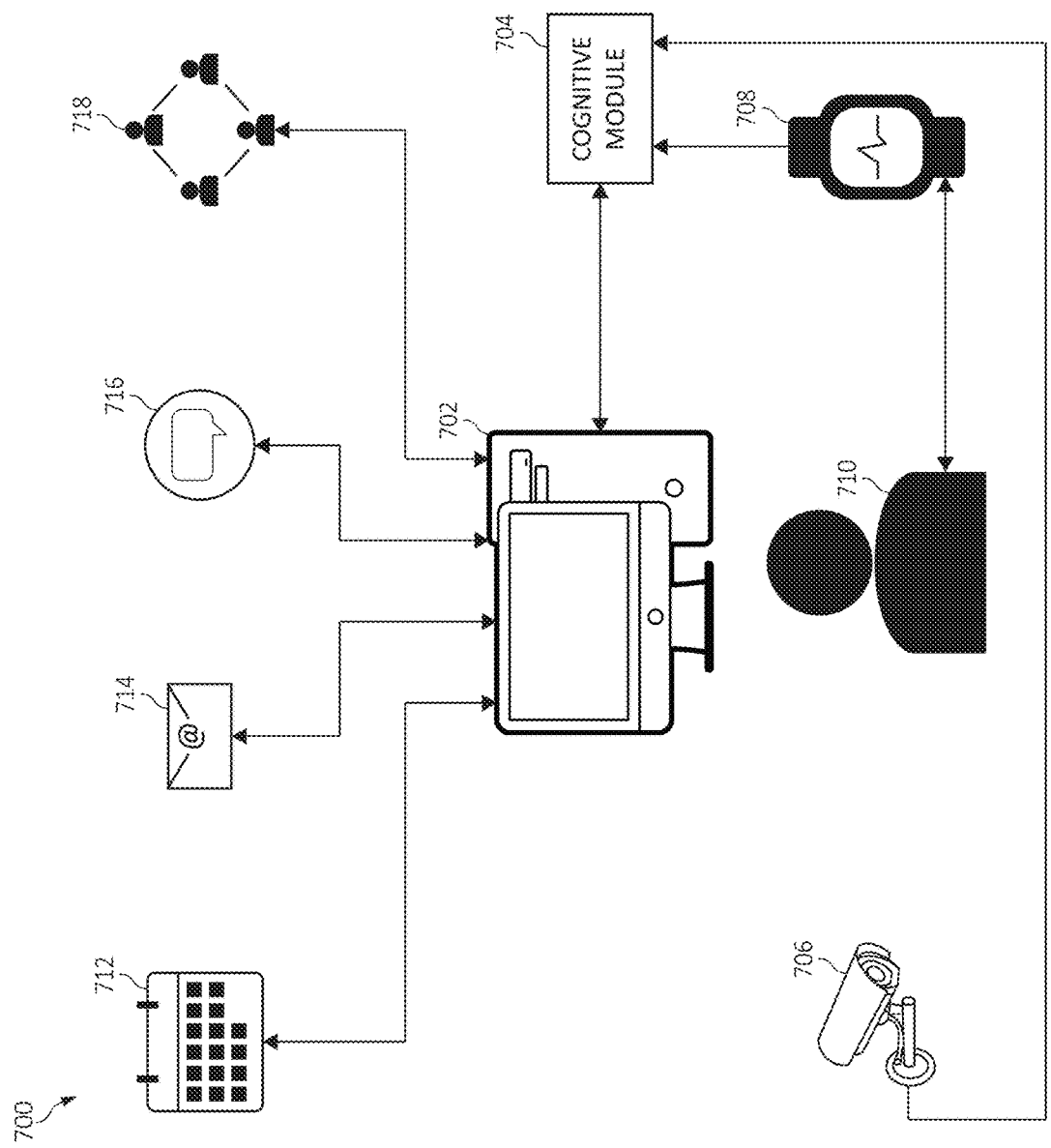
FIG. 7 is a block diagram of a computing environment according to an embodiment of the present invention.

FIG. 7 illustrates an exemplary computing environment 700 in which the methods and system described herein may be utilized according to some embodiments. The computing environment 700 includes a computing device 702, a cognitive module 704, at least one sensor 706, and a wearable device 708. The computing device (or node) 702 may be any suitable computing device through which a user 710 may, for example, perform a task (e.g., write code) and/or be made aware of concentration reducing events (e.g., receive notifications). Through the computing device 702, the user 710 may also interact with, for example, a calendar/schedule 712, an email application 714, messaging application 716, and a social media platform 718, which may be utilized by the methods and systems described herein to manage concentration, as discussed above.

In the depicted embodiment, the computing device 702 is a desktop PC. However, in other embodiments, the computing device 702 may be (or include) other devices, such as laptop computers, mobile phones, tablet devices, etc. Also, as described above, although only one computing device 702 is shown in FIG. 7, in some embodiments, the methods and system described herein may be applied to computing environments in which the user(s) 710 utilizes multiple devices (e.g., a desktop PC and a laptop computer). Also, it should be understood that in some embodiments the user tasks are not performed utilizing computing devices (e.g., household chores).

The cognitive module (or control system) 704 may include (and/or be implemented with) any suitable computing device or system, such as those described above, and may be configured to perform the management of concentration in work environments and/or any associated cognitive analysis, as described herein. The cognitive module 704 may be in operable communication with the computing device 702 (and/or content, applications, channels, etc. utilized by the computing device 702), the sensor 706, and the wearable device 708. Although the cognitive module 704 is shown as a separate component in FIG. 7, it should be understood that in some embodiments the cognitive module 704 may be integrated into another computing device (e.g., the computing device 702 or a remote device/server). As such, the various components shown in FIG. 7 may be integrated into common computing devices or multiple devices located locally or remotely (and in operable communication via any suitable communications network).

The sensor 706 may include any suitable sensor that is capable of monitoring the user 710, as described above. In some embodiments, the sensor 706 includes a camera and/or a microphone. The wearable device 708 may be any suitable wearable technology device, such as a smart watch, that may be utilized to perform additional monitoring of the user 710. For example, the wearable device 408 may include, for example, one or more biometric sensors, such as a heart rate and/or blood pressure monitor.

As one example of the functionality described herein, consider a scenario in which the system determines that a task of a user (e.g., already being performed or about to be initiated) is writing software code, which is related to the user's employment. In such a scenario, the system may determine that a relatively high concentration level is required for the task and/or calculate a relatively high concentration risk level for the task (e.g., "5"), along with determining that preferably the task is performed in a silent, isolated environment with no disturbances (e.g., a library, an office, etc.). When the task is being performed, the system may (i.e., as ameliorative actions) disable all irrelevant notifications (i.e., those not related to the particular task), provide computing environment resources that are required (or at least useful) for performing the task (e.g., run applications, open files, etc.), and/or provide recommendations regarding location and/or time to perform the task.

As another example, consider a user with a task of writing an article that is related to, but not critical for, their employment (i.e., as determined based on the various available information associated with the user and/or the task). In such a scenario, the system may determine a "medium" or "mid-level" level of concentration is required and/or calculate a suitable concentration risk level for such (e.g., "3"). It may be determined that the task may be performed in an environment with other individuals around, preferably with music playing (e.g., an open workspace with some people around). Ameliorative actions performed by the system in this scenario may include, for example, disabling social media notifications while leaving email notifications enabled and rearranging the user's schedule (or at least recommending such).

If the task is determined to have a low concentration level and/or a low concentration risk level, such as performing household chores (e.g., cleaning dishes), there may be no recommendations with respect to the environment. Ameliorative actions performed may include, for example, rendering videos and/or music (if preferred by the user) while allowing all notifications.

In some embodiments, the same general task may be determined to have different concentration risk levels depending on particular details. For example, if the telephonic conversation is determined to be work-related (e.g., based on a schedule/calendar entry or detected keywords), the concentration risk level may be calculated to be "4." Otherwise, the concentration risk level may be "2." In such instances, any ameliorative actions may change depending on the concentration risk level. If it's higher (e.g., 4), all notifications may be disabled, and if it's lower (e.g., 2), only particular (i.e., "important") notification may be allowed to proceed, while any others are disabled (or blocked).

As such, in some embodiments, methods and/or systems to generate resources and content for a user for an interruption free and/or concentration-conducive (or high concentration) work environment are provided. User input data may be received. Characteristics of a task of the user may be identified based on at least some of the user input data. Whether or not the task needs to be performed in high concentration environment is determined based on the identified characteristics of the task. In some scenarios, a computing environment is provided, generated, or altered based on this determination. In some embodiments, enterprise environment toolsets to optimize workforce productivity are provided based on enterprise job-roles/skills and or project requirements. Usable modulation of dynamic workforces may be performed for input into project/productivity/time management applications for collective enterprise level efficiency gains.

In some embodiments, particular content (or concentration reducing events) may dynamically override ameliorative actions based on event context. For example, phone calls from unknown phone numbers may be blocked, while phone calls from workplace personnel (e.g., a supervisor) may be allowed. Similar functionality may be performed with respect to, for example, push notifications, browser web traffic ports, emails, etc.

Figure 8:
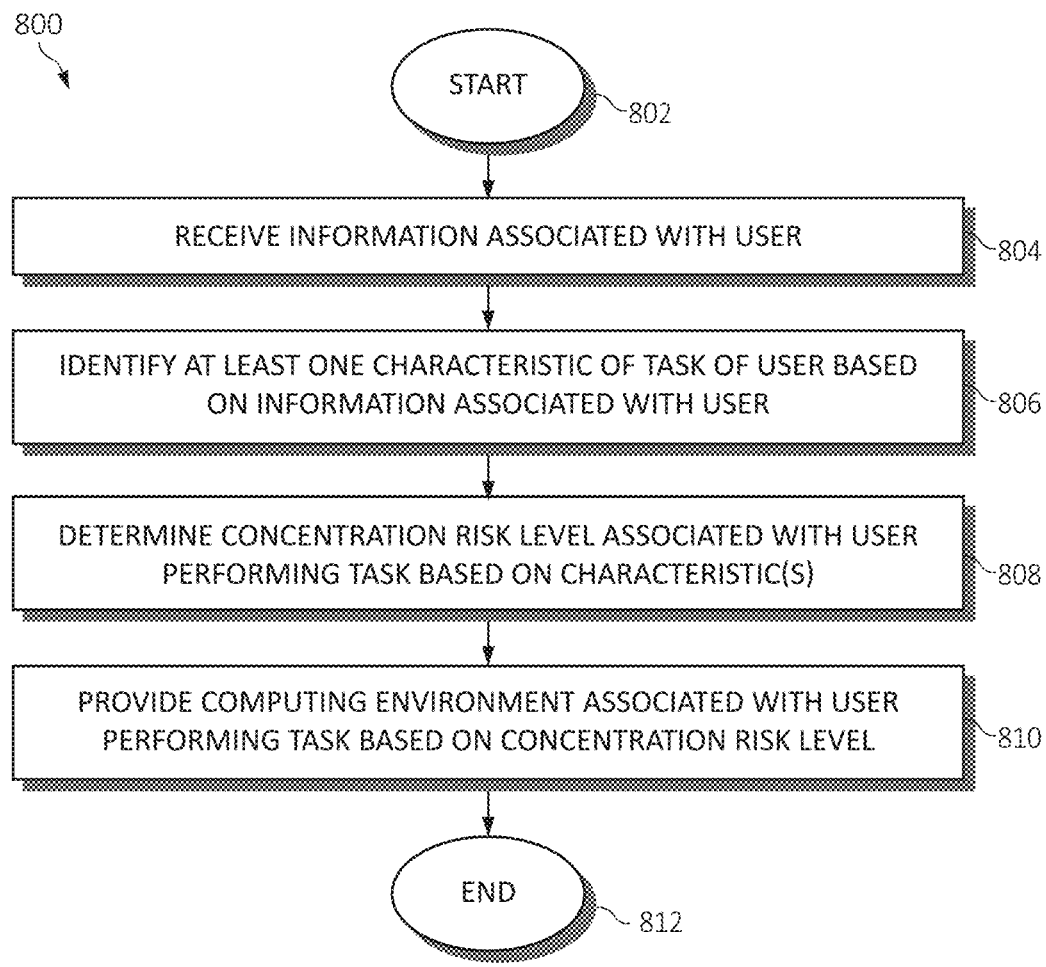
FIG. 8 is a flowchart diagram depicting an exemplary method for managing concentration in work environments according to an embodiment of the present invention.

Turning to FIG. 8, a flowchart diagram of an exemplary method 800 for managing concentration (or user concentration) in a work environment is illustrated. Method 800 begins (step 802) with, for example, the system monitoring a user performing multiple tasks while various types of concentration reducing events occur, as described above.

Information associated with a user is received (step 804). The information associated with the user may include at least one of a profile of the user, a schedule of the user, electronic communications of the user, social media activity of the user, and/or any other type of information described above. At least some of the information associated with the user may be detected utilizing a sensor, such as a camera, a microphone, and/or a biometric sensor.

At least one characteristic of a task of the user is identified based on the information associated with the user (step 806). The at least on characteristic of the task may include at least one of a task type associated with the task and a software application associated with the task. This process may be performed utilizing a cognitive analysis.

A concentration risk level associated with the user performing the task is determined based on the at least one characteristic of the task (and/or the information associated with the user) (step 808). The determining of the concentration risk level may include, for example, determining the importance of the task to the user and/or determining the concentration level required to perform the task. This process may be performed utilizing a cognitive analysis.

A computing environment associated with the user performing the task is provided based on based on the concentration risk level (step 810). The providing of the computing environment associated with the user performing the task may include at least one disabling notifications associated with at least one application within the computing environment and limiting functionality of at least one application within the computing environment. The providing of the computing environment associated with the user performing the task may (also) include generating a recommendation associated with at least one of a schedule of the user and a location for performing the task and generating a notification indicative of the generated recommendation.

Methods 800 ends (step 812) with, for example, the task being performed by the user in a reduced and/or relatively low interruption and/or concentration-conducive environment. Feedback may be provided by the user(s) and utilized to improve the performance of the system over time.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instruction.

The invention claimed is:

1. A method for managing user concentration in a work environment, by a processor, comprising:
   receiving information associated with a user;
   identifying at least one characteristic of a task of the user based on the information associated with the user;
   executing machine learning logic to train a concentration risk model using the information associated with the user, the identified at least one characteristic of the task, and outcomes of interactions of the user with one or more devices within a computing environment when performing the task as input;
   determining a concentration risk level associated with the user performing the task based on the concentration risk model and the at least one characteristic of the task, wherein the concentration risk level is indicative of a level of concentration required by the user to complete the task, and wherein a higher concentration risk level is indicative of a determination that the task should be performed by the user in a higher concentration environment having fewer distractions than a lower concentration environment;
   modifying the computing environment associated with the user performing the task from a first, original state to a second, modified state based on the concentration risk level by at least one of disabling notifications associated with at least one application within the computing environment and limiting functionality of at least one application within the computing environment;
   monitoring a progression of the task while being performed by the user;
   generating at least one Completely Automated Public Turing test to tell Computers and Humans Apart (CAPTCHA)-type challenge to the user based on the monitored progression of the task;
   restoring the computing environment to the first, original state based on user input to the CAPTCHA-type challenge;
   receiving feedback data from the user with respect to the performance of the modification of the computing environment based on the concentration risk level generated by the concentration risk model; and
   executing machine learning logic to use the feedback data to iteratively enhance the performance of the machine learning logic when determining second, third, and subsequent concentration risk levels respectively associated with performing second, third, and subsequent tasks, each a different type of task with respect to at least home-related tasks, work-related tasks, and entertainment-related tasks.

2. The method of claim 1, wherein the modifying of the computing environment associated with the user performing the task includes generating a recommendation associated with at least one of a schedule of the user and a location for performing the task and generating a notification indicative of the generated recommendation.

3. The method of claim 1, wherein the information associated with the user includes at least one of a profile of the user, a schedule of the user, electronic communications of the user, and social media activity of the user.

4. The method of claim 1, wherein at least some of the information associated with the user is detected utilizing a sensor, wherein the senor includes at least one of a camera, a microphone, and a biometric sensor.

5. The method of claim 1, wherein the at least on characteristic of the task includes at least one of a task type associated with the task and a software application associated with the task.

6. The method of claim 1, wherein at least one of the identifying of the at least one characteristic of a task of the user and the determining of the concentration risk level associated with the user performing the task is performed utilizing a cognitive analysis.

7. A system for managing user concentration in a work environment comprising:
a processor executing instructions stored in a memory device, wherein the processor:
receives information associated with a user;
identifies at least one characteristic of a task of the user based on the information associated with the user;
executes machine learning logic to train a concentration risk model using the information associated with the user, the identified at least one characteristic of the task, and outcomes of interactions of the user with one or more devices within a computing environment when performing the task as input;
determines a concentration risk level associated with the user performing the task based on the concentration risk model and the at least one characteristic of the task, wherein the concentration risk level is indicative of a level of concentration required by the user to complete the task, and wherein a higher concentration risk level is indicative of a determination that the task should be performed by the user in a higher concentration environment having fewer distractions than a lower concentration environment;
modifies the computing environment associated with the user performing the task from a first, original state to a second, modified state based on the concentration risk level by at least one of disabling notifications associated with at least one application within the computing environment and limiting functionality of at least one application within the computing environment;
monitors a progression of the task while being performed by the user;
generates at least one Completely Automated Public Turing test to tell Computers and Humans Apart (CAPTCHA)-type challenge to the user based on the monitored progression of the task;
restores the computing environment to the first, original state based on user input to the CAPTCHA-type challenge;
receives feedback data from the user with respect to the performance of the modification of the computing environment based on the concentration risk level generated by the concentration risk model; and
executes machine learning logic to use the feedback data to iteratively enhance the performance of the machine learning logic when determining second, third, and subsequent concentration risk levels respectively associated with performing second, third, and subsequent tasks, each a different type of task with respect to at least home-related tasks, work-related tasks, and entertainment-related tasks.

8. The system of claim 7, wherein the modifying of the computing environment associated with the user performing the task includes generating a recommendation associated with at least one of a schedule of the user and a location for performing the task and generating a notification indicative of the generated recommendation.

9. The system of claim 7, wherein the information associated with the user includes at least one of a profile of the user, a schedule of the user, electronic communications of the user, and social media activity of the user.

10. The system of claim 7, wherein at least some of the information associated with the user is detected utilizing a sensor, wherein the senor includes at least one of a camera, a microphone, and a biometric sensor.

11. The system of claim 7, wherein the at least on characteristic of the task includes at least one of a task type associated with the task and a software application associated with the task.

12. The system of claim 7, wherein at least one of the identifying of the at least one characteristic of a task of the user and the determining of the concentration risk level associated with the user performing the task is performed utilizing a cognitive analysis.

13. A computer program product for managing user concentration in a work environment, by a processor, the computer program product comprising a non-transitory computer-readable storage medium having computer-readable program code portions stored therein, the computer-readable program code portions comprising:
an executable portion that receives information associated with a user;
an executable portion that identifies at least one characteristic of a task of the user based on the information associated with the user;
an executable portion that executes machine learning logic to train a concentration risk model using the information associated with the user, the identified at least one characteristic of the task, and outcomes of interactions of the user with one or more devices within a computing environment when performing the task as input;
an executable portion that determines a concentration risk level associated with the user performing the task based on the concentration risk model and the at least one characteristic of the task, wherein the concentration risk level is indicative of a level of concentration required by the user to complete the task, and wherein a higher concentration risk level is indicative of a determination that the task should be performed by the user in a higher concentration environment having fewer distractions than a lower concentration environment;
an executable portion that modifies the computing environment associated with the user performing the task from a first, original state to a second, modified state based on the concentration risk level by at least one of disabling notifications associated with at least one application within the computing environment and limiting functionality of at least one application within the computing environment;
an executable portion that monitors a progression of the task while being performed by the user;

an executable portion that generates at least one Completely Automated Public Turing test to tell Computers and Humans Apart (CAPTCHA)-type challenge to the user based on the monitored progression of the task;

an executable portion that restores the computing environment to the first, original state based on user input to the CAPTCHA-type challenge;

an executable portion that receives feedback data from the user with respect to the performance of the modification of the computing environment based on the concentration risk level generated by the concentration risk model; and an executable portion that executes machine learning logic to use the feedback data to iteratively enhance the performance of the machine learning logic when determining second, third, and subsequent concentration risk levels respectively associated with performing second, third, and subsequent tasks, each a different type of task with respect to at least home-related tasks, work-related tasks, and entertainment-related tasks.

14. The computer program product of claim 13, wherein the modifying of the computing environment associated with the user performing the task includes generating a recommendation associated with at least one of a schedule of the user and a location for performing the task and generating a notification indicative of the generated recommendation.

15. The computer program product of claim 13, wherein the information associated with the user includes at least one of a profile of the user, a schedule of the user, electronic communications of the user, and social media activity of the user.

16. The computer program product of claim 13, wherein at least some of the information associated with the user is detected utilizing a sensor, wherein the senor includes at least one of a camera, a microphone, and a biometric sensor.

17. The computer program product of claim 13, wherein the at least on characteristic of the task includes at least one of a task type associated with the task and a software application associated with the task.

18. The computer program product of claim 13, wherein at least one of the identifying of the at least one characteristic of a task of the user and the determining of the concentration risk level associated with the user performing the task is performed utilizing a cognitive analysis.

* * * * *